Dec. 21, 1965          A. H. COOKE                3,224,653
BIN FOR BULK MATERIALS AND APPARATUS FOR MANIPULATING BINS
Filed June 26, 1963                           3 Sheets-Sheet 1
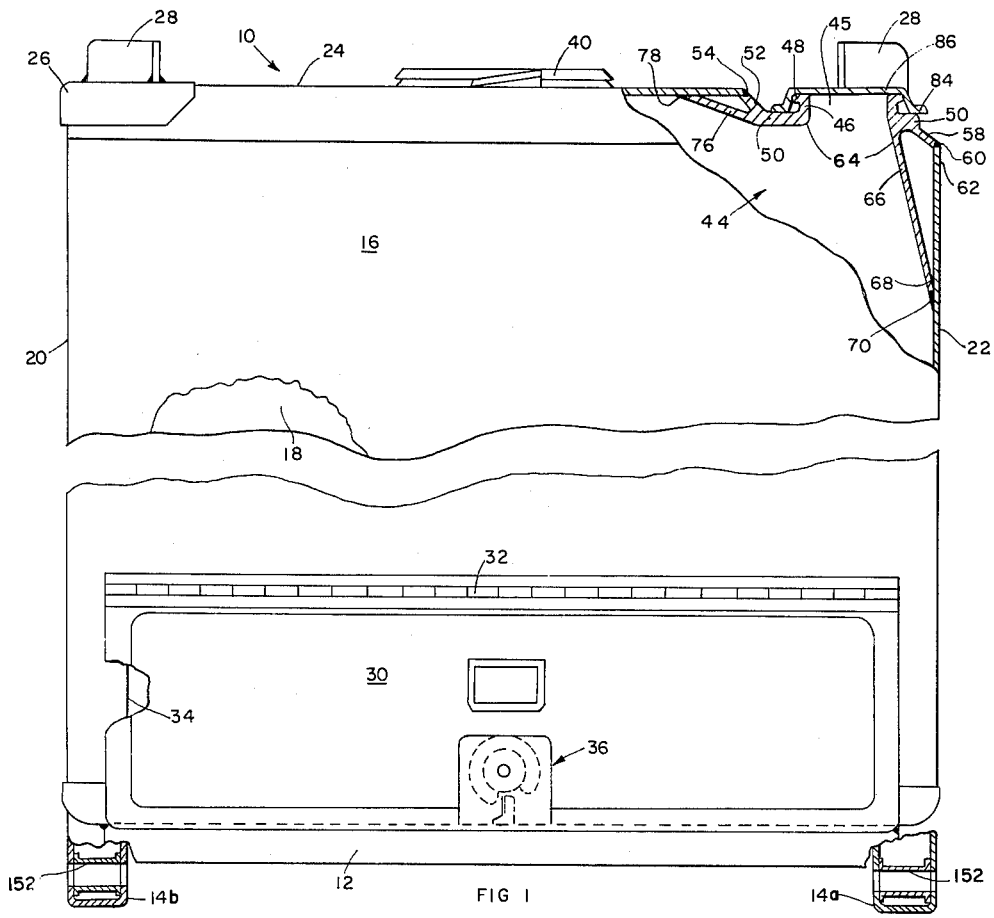
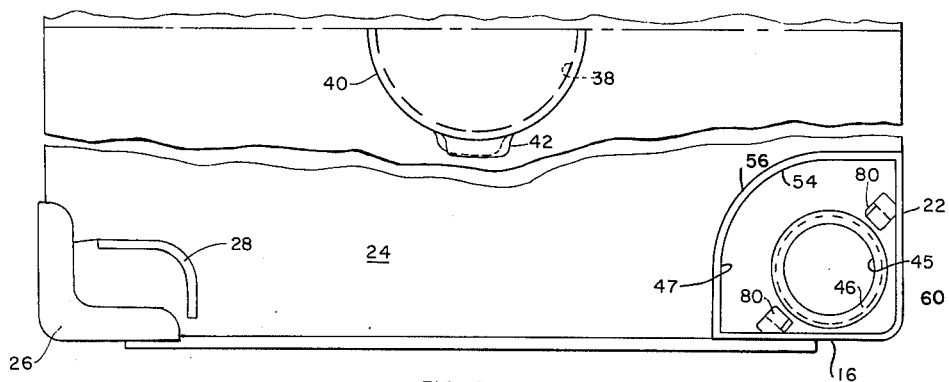
INVENTOR.
ARTHUR H. COOKE
BY
OLSEN & STEPHENSON Dec. 21, 1965     A. H. COOKE     3,224,653
BIN FOR BULK MATERIALS AND APPARATUS FOR MANIPULATING BINS
Filed June 26, 1963     3 Sheets-Sheet 2
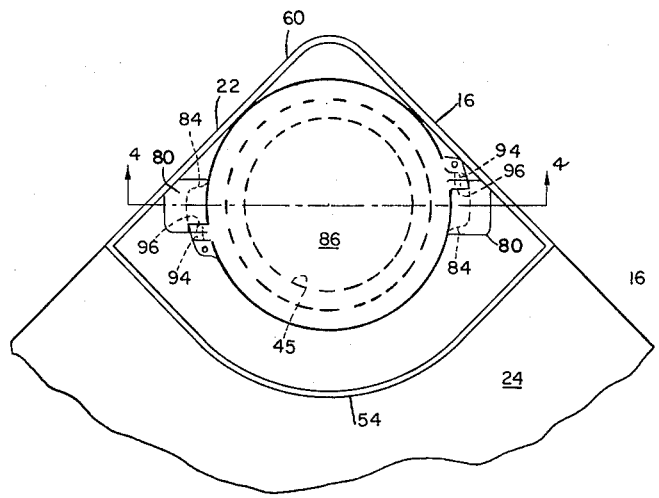
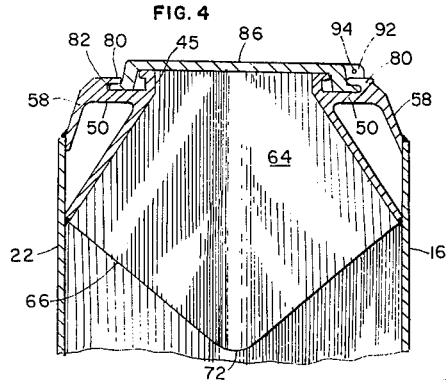
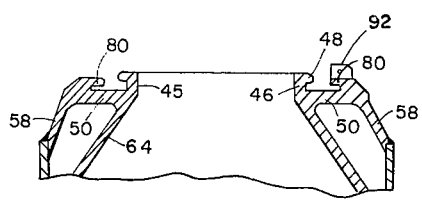
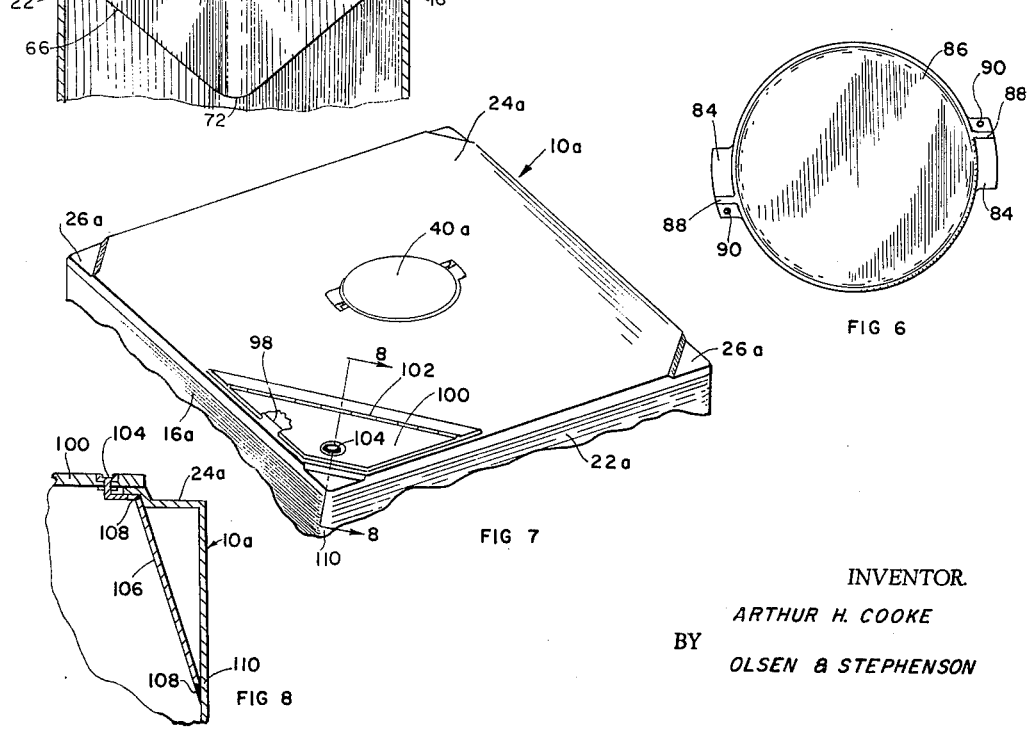
INVENTOR.
ARTHUR H. COOKE
BY
OLSEN & STEPHENSON

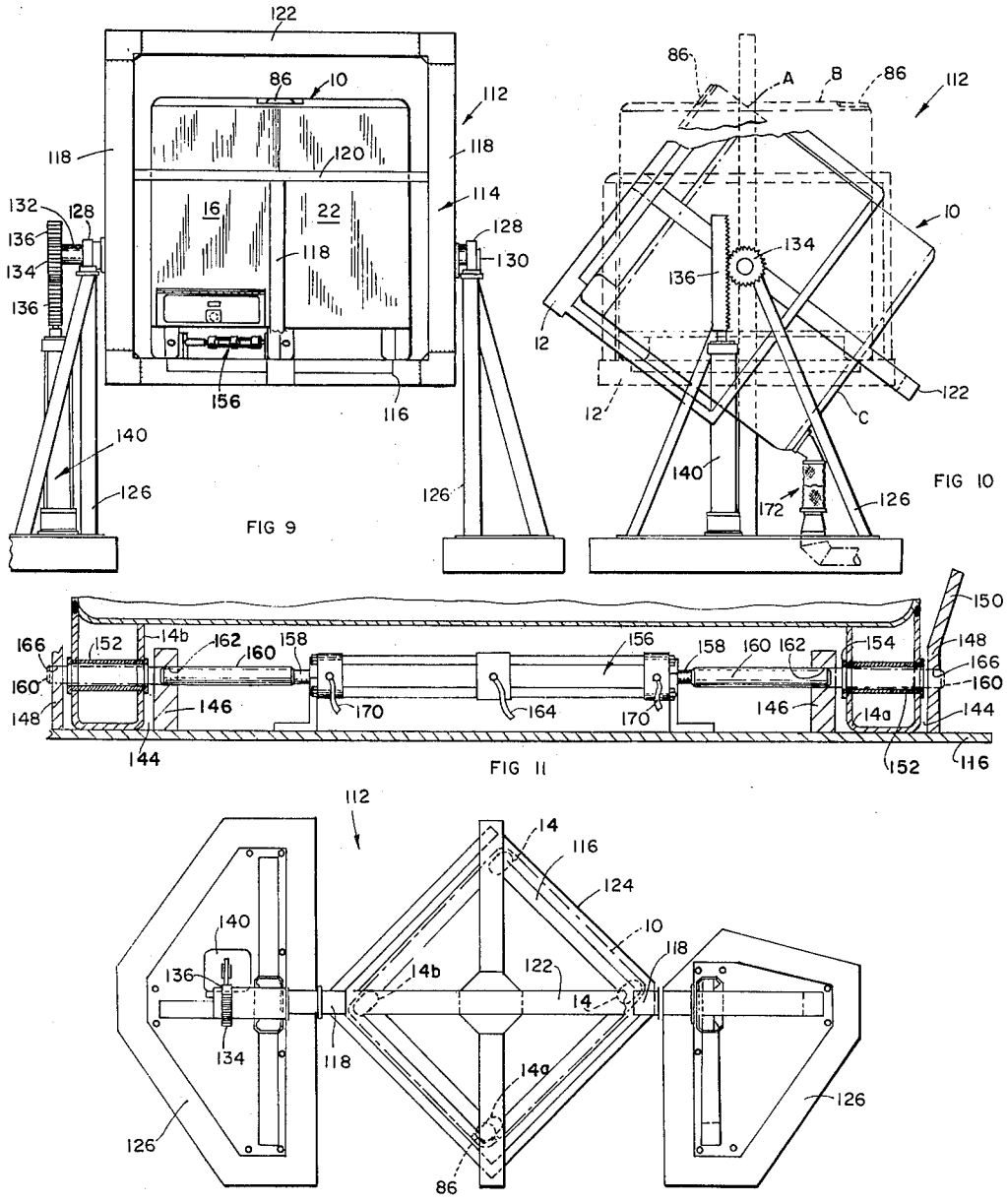

United States Patent Office 3,224,653
Patented Dec. 21, 1965

3,224,653
BIN FOR BULK MATERIALS AND APPARATUS
FOR MANIPULATING BINS
Arthur H. Cooke, Leamington Spa, England, assignor to Hoover Ball and Bearing Company, Saline, Mich., a corporation of Michigan
Filed June 26, 1963, Ser. No. 290,760
4 Claims. (Cl. 222—462)

This invention relates generally to apparatus for handling bulk material such as granular, pulverulent and like materials, and more particularly to an improved bin for transporting and storing bulk material and apparatus for manipulating the bin to filling and discharge positions.

In the handling of bulk material, bins, for example bins of the type shown in U.S. Patent 2,648,428 can be utilized for transporting and storing the bulk material. It is desirable that the maximum internal volume of the bin be utilized for containing the bulk material which is to be stored and/or transported, that the bin be readily manipulated to fully discharge the bin contents, and that the bin be constructed so that it is versatile for a variety of applications. Furthermore, in bin manipulation apparatus, it is desirable that the apparatus be capable of quick and easy assembly with a bin and that it be capable of use for both filling and discharging the bin. It is an object of this invention, therefore, to provide an improved bin and bin manipulating apparatus which accomplish the above objectives and which are economical to manufacture and are capable of use over a prolonged service life.

Further objects, features and advantages of this invention will become apparent from a consideration of the following description, the appended claims, and the accompanying drawing in which:

FIGURE 1 is a foreshortened elevational view of the improved bin of this invention, with some parts broken away and other parts shown in section for the purpose of clarity;

FIGURE 2 is a fragmentary plan view of the bin shown in FIG. 1, with the cover for the corner opening removed;

FIGURE 3 is an enlarged fragmentary plan view of a top corner portion of the bin shown in FIG. 1, with the cover for the corner opening installed on the bin;

FIGURE 4 is a sectional view of a portion of the bin of this invention, looking substantially along the line 4—4 in FIG. 3;

FIGURE 5 is a sectional view, illustrated similarly to FIG. 4, with the cover for the corner opening removed;

FIGURE 6 is a top view of the cover for the corner opening in the bin of this invention;

FIGURE 7 is a fragmentary perspective view showing the top of a modified form of the bin of this invention;

FIGURE 8 is a fragmentary sectional view of a portion of the modified bin of this invention, looking substantially along the line 8—8 of FIG. 7;

FIGURE 9 is an elevational view of the apparatus of this invention for manipulating the bin of this invention for filling and discharging of the bin and showing a bin mounted thereon;

FIGURE 10 is an end view of the apparatus shown in FIG. 9, illustrating the apparatus moved to a bin discharge position in solid lines, and showing the bin filling and loading positions of the apparatus in broken lines;

FIGURE 11 is a fragmentary detail elevational view of the bin locking mechanism which forms a part of the bin manipulating apparatus shown in FIGS. 9 and 10, shown in assembly relation with the lower end of a bin; and FIGURE 12 is a plan view of the bin manipulating apparatus shown in FIGS. 9 and 10, showing a bin thereon in broken lines and showing the apparatus in a bin loading and unloading position.

With reference to the drawing, the bin of this invention, indicated generally at 10 in FIG. 1, follows generally the construction of the bin shown in U.S. Patent 2,648,428 in that it includes a generally rectangular bottom wall 12 having depending legs 14 (two of which are sometimes identified as 14a and 14b for a purpose to appear later) positioned at the corners of the bottom wall 12, a front wall 16, a rear wall 18, and side walls 20 and 22 which are secured to and extend upwardly from the bottom wall 12. For purposes of brevity the walls 16 and 18 are also sometimes referred to herein as side walls. In addition, the bin 10 includes the usual top wall 24 which is generally rectangular, and of the same size as the bottom wall 12, and is secured to the upper ends of the side walls 16, 18, 20 and 22. The top wall 24 has leg supporting portions 26 formed at three of the corners of the top wall 24 and positioned in substantially vertical alignment with three of the legs 14. Leg locating angles 28 are secured to the top wall 24 adjacent the corner leg supporting portions 26 for maintaining the legs 14 of a similar bin 10 stacked on top the bin 10 in fixed positions on the bin top wall 24.

The bin 10 is illustrated in FIGS. 1 and 2 as including a discharge door 30 mounted on a hinge 32 secured to the front wall 16 adjacent the lower end thereof for movement to the position shown in FIG. 1 in which it closes a discharge opening 34 formed in the front wall 16. A conventional latch assembly 36 is carried by door 30 and is operable to releasably maintain the door 30 in a closed position. The bin 10 is also illustrated as having a filling opening 38 formed in the top wall 24 at substantially the center of the top wall 24 and a cover 40 is provided for closing the opening 38 and for engagement with a pair of retaining ears 42 (only one of which is shown) on the top wall 24 for maintaining the cover 40 in a closed position. It is to be understood that while the bin 10 is illustrated as having the front wall discharge opening 34 and the filling opening 38, since the inclusion of these openings makes the bin 10 more versatile for bulk material handling purposes, it is within the purview of this invention to form the bin 10 without the opening 34 and 38.

The bin 10 differs from the bin shown in U.S. Patent 2,648,428 in that it includes a unitary irregularly shaped transition member 44 (FIG. 1) which is incorporated in one of the top corners of the bin 10 and forms a bin opening 45. The transition member 44 facilitates filling of the bin with bulk material and facilitates discharge of this material from the bin. In the transition member 44 the opening 45 is defined by a relatively short tubular portion 46 wihch extends upwardly in the upright position of the bin 10 shown in FIG. 1 and is formed at its upper end with a radially outwardly extending bead or flange 48. At its lower end, the tubular portion 46 is formed integral with a radially outwardly extending flange 50 which is of an irregular shape.

The transition member 44 is placed in an opening 47 formed in one corner of the top wall 24, and on one side of the tubular portion 46, the flange 50 has an upwardly extending portion 52 which is secured, as by welding 54, to a curved edge 56 of the top wall opening 47. On the other side of the tubular portion 46, the flange 50 has a downwardly extending portion 58 which is secured, as by welding 60, to the upper ends of the bin side walls 16 and 22. The transition member 44 also includes a funnel section 64 which is formed integral with the flange 50 and functions to guide bulk material in the bin 10 toward the tubular portion 46 when the bin is tipped to a discharge position. The funnel section 64 has a first portion 66 which extends downwardly from the flange 50 and is secured at its lower end 68, as by welding 70, to the inner sides of the bin walls 16 and 22 adjacent the bin corner 72. A second portion 76 of the funnel section 64 is also formed integral with the flange 50 and extends upwardly from the flange 50 and is secured, as by welding 78, to the under side of the bin top wall 24.

A pair of undercut ears 80 (FIGS. 3–5), formed integral with the flange 50, and disposed above the flange 50 in substantial alignment with the bead 48 on the tubular portion 46 form retaining grooves 82 for a pair of flange-type ears 84 on a cover 86 which is provided for the transition member 44. The cover 86 (FIG. 6) has the ears 84 formed at substantially diametrically opposite positions thereon and upwardly extending projections 88 are formed integral with the ears 84. Openings 90 are formed in the ears 84 to adapt the ears for the application of a torque-type tool thereto. In applying the cover 86 to the transition member 44, the cover is positioned on the upper end of the tubular portion 46 so that the ears 84 are supported on the flange 50 at positions spaced circumferentially from the ears 80. The cover 86 is then rotated in a clockwise direction so that the ears 84 are progressively moved into the guide grooves 82. This rotation of the cover 86 is continued until the projections 88 on the ears 84 engage similar upright projections 92 formed on the ears 80. Openings 94 and 96 on the projections 92 and 88, respectively, are aligned when the ears 88 and 92 are engaged so that a locking pin or wire (not shown) can be inserted through the openings 94 and 96 to lock the cover 86 on the transition member 44 in a position closing the bin opening 45. To remove the cover 86, the locking pins or wires are removed and the cover 86 is rotated in a counter-clockwise direction from its position shown in FIG. 3 until the ears 84 are moved out from under the ears 80. When a second bin 10 is stacked on the bin 10 shown in FIG. 1, three of the second bin legs rest on the leg supporting portions 26 and the fourth leg rests on the cover 86.

A modified form of the bin of this invention, indicated generally at 10a in FIG. 7, is similar to the bin 10 described above and like numerals, with the letter suffixe "a," are therefore used on the bin 10a to indicate like parts on the bin 10. The bin 10a includes side walls 16a and 22a, a top wall 24a having corner leg supporting portions 26a which are substantially aligned with bottom legs (not shown) and is illustrated as having a centrally located top cover 40a which may be omitted if desired. The bin 10a differs from the bin 10 in that it is provided with a top corner filling and discharge opening 98 which can be closed by a generally triangular corner cover 100 which is secured to the bin top wall by a hinge structure 102. A latch assembly 104 on the cover is engageable with the bin top wall to lock the cover 100 in a closed position. A transition member 106 secured as by welding 108 its upper and lower ends to the bin corner 110 and the bin top wall 24a functions to direct bulk material in the bin 10a toward the opening 98 on tipping of the bin 10a to a position in which the opening 98 is at a vertical position such that material in the bin will flow out of the opening 98.

Bin manipulating apparatus, indicated generally at 112 (FIGS. 9, 10 and 12), is provided for manipulating the bins 10 and 10a to facilitate filling the bins and discharging the bin contents, and is shown in FIGS. 9 and 10 with a bin 10 mounted thereon. The apparatus 112 includes a rotatable frame 114 which consists of a bin supporting platform 116 having upright frame members 118 secured thereto and connected by cross frame members 120 and 122. The frame 114 is constructed so that it has an open side 124 on which the cross frame members 120 are omitted so that the bin 10 can be moved horizontally across the top side of the platform 116 to a supported position on the platform 116 which is of a generally rectangular shape larger than the rectangular bottom wall 12 of the bin 10.

The frame 114 is supported on the upper ends of a pair of floor mounted stand units 126 which support axially aligned trunnions 128 in which a pair of short shafts 130 and 132 are rotatably mounted. The inner ends of the aligned shafts 130 and 132 are secured to a pair of the upright frame members 118 disposed at a pair of the corners of the platform 124. A pinion gear 134 is mounted on the outer end of the shaft 132 and a rack 136 is secured to the piston rod 138 for a fluid actuated cylinder assembly 140 that is mounted at its lower end in a fixed position on the stand unit 126. On extension and retraction of the piston rod 138, with the rack 136 in meshing engagement with the pinion gear 134, the frame 114 is rotatable about the axis of the trunnions 128.

In the use of the apparatus 112, a fork lift truck or the like (not shown) is utilized to move the bin 10, front side 16 first, across the open side 124 of platform 116. The bin 10 is then lowered onto the platform 116 in a position in which the bin legs 14 are located adjacent the platform corners. In this position of the bin 10, a pair of the bin legs 14, indicated at 14a and 14b for purposes of clarity, are positioned within leg receiving pockets 144 formed on the platform 116. The bin leg 14a is aligned with the corner of the bin 10 in which the transition member 44 is located and the leg 14b is one of the legs that is adjacent the leg 14a.

Each of the bin pockets 144 includes a pair of upright walls 146 and 148, and the wall 148 includes an outwardly inclined upper portion 150 which acts to guide a leg into the pocket 144. Each of the legs 14a and 14b has an opening extended therethrough in which a bushing 152 is mounted. The outer ends of the bushing 152 are provided with outwardly directed flanges 154 so as to maintain the bushing in a mounted position on the bin leg. A double acting fluid operated cylinder assembly 156 is mounted on the platform 116 at a position between the walls 146. The cylinder assembly 156 includes a pair of oppositely extending piston rods 158 which are secured at their outer ends to leg locking pins 160.

In the retracted positions of the piston rods 158, shown in solid lines in FIG. 11, the locking pins 160 are slidably supported at their outer ends in openings 162 in the walls 146. On a supply of fluid to the cylinder assembly 156 through a conduit 164, the piston rods 158 are extended to move the locking pins 160 in opposite directions through the leg bushings 152 and through openings 166 in the walls 148, as shown in broken lines in FIG. 11, to thereby positively lock the bin legs 14a and 14b to the platform 116. On a supply of fluid to the cylinder assembly 156 through a pair of conduits 170, the piston rods 158 are retracted so as to withdraw the locking pins 160 from the openings 166 and the bushings 152 so that the bin 10 can be moved off the platform 116.

After the bin 10 has been loaded onto the platform 116 and the cylinder assembly 166 has been actuated to lock the bin legs 14a and 14b to the platform 116, the apparatus 112 is operable, on rotation of frame 114, to move the bin 10 to a bin filling position, indicated at A in FIG. 10, in which the cover 86 for the transition member 44 is at the upper most corner of the bin. The frame 114 is also movable to a bin loading and unloading position, indicated at B in FIG. 10, in which the platform 116 is substantially horizontal, and a bin discharge position, indicated at C in FIG. 10, in which the transition member 44 is at the lowermost corner of the bin 10. As shown in FIG. 10, a spout assembly 172 can be mounted on the stand 126 for receiving the bin contents when the bin has been moved to its discharge position.

From the above description it is seen that this invention provides bins 10 and 10a which are provided with top corner openings 45 and 98, respectively, through which the bin may be filled and through which the bin contents can be discharged. This filling and discharging is readily accomplished by use of the bin manipulating apparatus 112 to move the bin 10 between positions in which the corner opening is at the top end of the bin for filling and at the lower end of the bin for discharging. As a result of the location of the top corner opening, the bin 10 or 10a may be substantially completely filled with a granular material without manually agitating the material, which cannot be achieved if the opening is located at any other position in the top of the bin. In other words, because of the angle of repose of a granular material, the bin 10 or 10a cannot be completely filled through a centrally disposed top opening, such as the opening 38, without agitating the material. Furthermore, by virtue of the location of the top corner opening, when the bin is moved to position C for discharging material, any material packed in the bin during transport is broken up on contact with the bin top wall when the bin is inverted, so that the material readily flows through the discharge opening. By forming the bin 10 with the discharge opening 34 in a side wall and the centrally disposed top filling opening 38, in addition to the top corner opening 45 or 98, the bin 10 is adapted for a variety of purposes in a bulk material handling system requiring different filling and discharge situations and therefore has the additional advantage of flexibility.

It will be understood that the bin for bulk materials and apparatus for manipulating bins which are herein disclosed and described are presented for purposes of explanation and illustration and are not intended to indicate limits of the invention, the scope of which is defined by the following claims.

What is claimed is:

1. In a shipping container for granular materials, a rectangular bottom wall provided adjacent its corners with depending legs, substantially rectangular side walls extending upwardly from said bottom wall, a rectangular top wall secured to the upper ends of said side walls and having corner leg supporting portions at three of the corners thereof positioned in substantial vertical alignment with three of said legs, means providing a filling and discharge opening in the fourth corner of said top wall, said means comprising a unitary transition member formed of a rigid material for directing bulk material into or out of said container, said member having an upwardly directed tubular portion, an irregularly shaped flange integral with said tubular portion and extending transversely thereof, said flange being secured to the upper ends of a pair of said side walls which intersect adjacent said fourth corner and to said top wall so that said tubular portion is in a substantially fluid tight relation with said top and side walls, flow directing means formed integral with said tubular portion and secured to said pair of side walls below said flange for directing material in said container to said tubular portion on tipping of said container, a cover for the upper end of said tubular portion, and coacting means on said cover and transition member releasably maintaining said cover in a mounted position on said tubular portion.

2. In a shipping container for granular materials, a rectangular bottom wall provided adjacent its corners with depending legs, substantially rectangular side walls extending upwardly from said bottom wall, a rectangular top wall secured to the upper ends of said side walls and having corner leg supporting portions at three of the corners thereof positioned in substantial vertical alignment with three of said legs, means providing a filling and discharge opening in the fourth corner of said top wall, said means comprising a unitary transition member formed of a rigid material for directing bulk material into or out of said container, said member having an upwardly directed tubular portion, an irregularly shaped flange integral with said tubular portion and extending transversely thereof, said flange being secured to the upper ends of a pair of said side walls which intersect adjacent said fourth corner and to said top wall so that said tubular portion is in a substantially fluid tight relation with said top and side walls, flow directing means formed integral with said tubular portion and secured to said pair of side walls and to said top wall for directing material in said container to said tubular portion on tipping of said container, a cover for the upper end of said tubular portion, and coacting means on said cover and transition member releasably maintaining said cover in a mounted position on said tubular portion.

3. In a shipping container for granular materials, a rectangular bottom wall, a rectangular top wall having four corners, upright side walls connected to and extending between said bottom and top walls, means in said top wall forming a filling and discharge opening adjacent one of said four corners, a cover on said top wall for closing said opening, said means comprising a transition member arranged within said container for directing material in said container to be discharged toward said opening when said container is tipped for discharge, said transition member having a tubular portion one end of which forms said filling and discharge opening and a funnel section having a pair of ends one of which is larger than the other, said funnel section being attached at the smaller of its ends to the opposite end of said tubular portion and having the larger of its ends attached to said top and a pair of said side walls which intersect adjacent said one corner so as to direct material toward said tubular portion on tipping of said container.

4. In a shipping container for granular materials, a rectangular bottom wall, a rectangular top wall having four corners and a filling opening disposed in substantially the center thereof, upright side walls connected to and extending between said bottom and top walls, one of said side walls having a discharge opening formed therein adjacent the lower end thereof, means in said top wall forming a filling and discharge opening adjacent one of said four corners, a removable cover on said top wall closing said filling and discharge opening, said means comprising a transition member arranged within said container for directing material in said container to be discharged toward said filling and discharge opening when said container is tipped for discharge, said transition member having a tubular portion one end of which forms said filling and discharge opening and a funnel section having a pair of ends one of which is larger than the other, said funnel section being attached at the smaller of its ends to the opposite end of said tubular portion and having the larger of its ends attached to said top and a pair of said side walls which intersect adjacent said one corner so as to direct material toward said tubular portion on tipping of said container.

References Cited by the Examiner

UNITED STATES PATENTS 194,784    9/1877    Redmond _____ 222—462

(Other references on following page)

UNITED STATES PATENTS

| | | | |
|---|---|---|---|
| 371,276 | 10/1887 | Reeves | 222—462 |
| 586,122 | 7/1897 | Gale | 220—87 |
| 1,170,546 | 2/1916 | Keiner et al. | 220—40 |
| 1,176,653 | 3/1916 | Chow | 222—540 X |
| 1,470,579 | 10/1923 | Rohdiek. | |
| 1,600,416 | 9/1926 | McEwan | 214—312 |
| 1,854,130 | 4/1932 | Francis | 214—462 |
| 2,601,941 | 7/1952 | Phillips | 222—547 |
| 2,648,428 | 8/1953 | White et al. | 206—56 |
| 2,887,256 | 5/1959 | Thornhill | 222—572 |
| 2,973,119 | 2/1961 | Parker | 222—540 |
| 3,081,005 | 3/1963 | O'Connor | 222—498 |

FOREIGN PATENTS 550,840   12/1922   France.

M. HENSON WOOD, Jr., *Primary Examiner.*

FRANKLIN T. GARRETT, LOUIS J. DEMBO,
*Examiners.*